US010897435B2

(12) United States Patent
Chen

(10) Patent No.: US 10,897,435 B2
(45) Date of Patent: Jan. 19, 2021

(54) INSTANT MESSAGING METHOD AND SYSTEM, AND ELECTRONIC APPARATUS

(71) Applicant: Wistron Corporation, New Taipei (TW)

(72) Inventor: Feng-Yuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 130 days.

(21) Appl. No.: 15/702,705

(22) Filed: Sep. 12, 2017

(65) Prior Publication Data

US 2018/0302352 A1    Oct. 18, 2018

(30) Foreign Application Priority Data

Apr. 14, 2017    (TW) .............................. 106112490 A

(51) Int. Cl.
*G06F 3/048*    (2013.01)
*H04L 12/58*    (2006.01)
(Continued)

(52) U.S. Cl.
CPC .......... *H04L 51/04* (2013.01); *G06F 3/04883* (2013.01); *G06F 3/04842* (2013.01); *G06F 3/147* (2013.01); *G06F 2203/04803* (2013.01)

(58) Field of Classification Search
CPC ..... G06F 3/0481–0489; G06F 3/04883; G06F 2203/04803; G06F 3/04842; G06F 3/147;
(Continued)

(56) References Cited

U.S. PATENT DOCUMENTS 5,870,548 A *  2/1999  Nielsen ................ G06Q 10/107
379/93.24
6,232,969 B1 *  5/2001  Fawcett ................ G06F 3/0236
345/467
(Continued)

FOREIGN PATENT DOCUMENTS

CN    103269304    8/2013
CN    103399745    11/2013
(Continued)

OTHER PUBLICATIONS

"Office Action of Taiwan Counterpart Application," dated Mar. 9, 2018, p. 1-p. 12.
(Continued)

*Primary Examiner* — Steven B Theriault
(74) *Attorney, Agent, or Firm* — JCIPRNET

(57) ABSTRACT

An instant messaging method and system, and an electronic apparatus are provided. An instant messaging interface is activated in the electronic apparatus. A preview area is added to the instant messaging interface after the instant messaging interface triggers an edit mode. After one of message contents in the instant messaging interface is determined to be selected as an edited target, a message content object corresponding to the selected edited target is displayed in the preview area of the instant messaging interface. A touch operation corresponding to the edited target is received in the instant messaging interface, and attribute data is generated based the touch operation. The message content object corresponding to the selected edited target is adjusted in the preview area based on the attribute data.

12 Claims, 9 Drawing Sheets

(51) Int. Cl.
*G06F 3/0488* (2013.01)
*G06F 3/0484* (2013.01)
*G06F 3/147* (2006.01)

(58) Field of Classification Search
CPC .... G06F 40/166; G06F 3/04855; G06F 16/26; G06F 16/958; G06F 8/38; G06F 3/0233; G06F 3/0416; G06F 3/167; G06F 9/4411; H04L 51/04; H04L 51/046; G06Q 10/107; G06Q 10/10; G06Q 30/02; G06Q 30/0601; G06Q 50/01
See application file for complete search history.

(56) References Cited

U.S. PATENT DOCUMENTS

| | | | | |
|---|---|---|---|---|
| 6,795,093 | B1* | 9/2004 | Chesley | H04L 12/1831 715/733 |
| 7,185,059 | B2* | 2/2007 | Daniell | G06Q 10/107 709/203 |
| 7,222,299 | B1* | 5/2007 | Lim | G06F 17/218 715/273 |
| 7,296,057 | B2* | 11/2007 | Vincent | H04L 51/04 709/204 |
| 7,305,627 | B2* | 12/2007 | Tannenbaum | G06Q 10/107 715/751 |
| 7,428,702 | B1* | 9/2008 | Cervantes | G06Q 10/107 715/243 |
| 7,624,146 | B1* | 11/2009 | Brogne | G06Q 10/107 370/463 |
| 7,734,702 | B2* | 6/2010 | Kim | H04L 51/04 709/206 |
| 7,774,418 | B2* | 8/2010 | Tang | H04L 51/04 455/405 |
| 7,882,182 | B2* | 2/2011 | Bhakta | G06Q 10/107 709/203 |
| 8,209,385 | B2* | 6/2012 | Partaker | G06Q 10/107 709/206 |
| 8,321,786 | B2* | 11/2012 | Lunati | G06F 17/273 715/234 |
| 8,700,776 | B2* | 4/2014 | Rasmussen | G06Q 10/107 709/204 |
| 8,831,929 | B2* | 9/2014 | Hong | G06F 17/2223 704/4 |
| 9,026,935 | B1* | 5/2015 | Rasmussen | H04L 51/04 715/764 |
| 9,087,030 | B2* | 7/2015 | Basile | G06F 17/211 |
| 9,129,027 | B1* | 9/2015 | Hamedi | G06F 16/9535 |
| 9,154,605 | B2* | 10/2015 | Stovicek | G06Q 10/10 |
| 9,411,506 | B1* | 8/2016 | Prado | G06F 3/04817 |
| 9,477,374 | B1* | 10/2016 | Snabl | G06F 3/04817 |
| 9,477,947 | B2* | 10/2016 | Farrell | G06Q 10/00 |
| 10,019,133 | B1* | 7/2018 | McNeill | H04L 67/36 |
| 10,025,487 | B2* | 7/2018 | Thorsander | G06F 3/0488 |
| 10,063,498 | B2* | 8/2018 | Lee | H04L 51/04 |
| 10,191,608 | B2* | 1/2019 | Park | H04M 1/72552 |
| 10,416,838 | B2* | 9/2019 | Kalaboukis | G06F 3/0481 |
| 10,708,210 | B1* | 7/2020 | Allen | G06F 16/215 |
| 2002/0194229 | A1* | 12/2002 | Decime | G06F 17/273 715/257 |
| 2002/0194278 | A1* | 12/2002 | Golan | G06Q 10/107 709/206 |
| 2003/0086438 | A1* | 5/2003 | Laumen | H04L 29/06 370/462 |
| 2003/0131050 | A1* | 7/2003 | Vincent | H04L 51/04 709/203 |
| 2003/0140103 | A1* | 7/2003 | Szeto | H04L 51/04 709/206 |
| 2003/0200268 | A1* | 10/2003 | Morris | G06Q 90/00 709/206 |
| 2003/0212746 | A1* | 11/2003 | Fitzpatrick | H04L 12/1827 709/206 |
| 2003/0226111 | A1* | 12/2003 | Wirts | G06F 8/38 715/209 |
| 2004/0162877 | A1* | 8/2004 | Van Dok | G06F 3/0481 709/204 |
| 2004/0230642 | A1* | 11/2004 | Collet | H04L 51/12 709/200 |
| 2005/0008128 | A1* | 1/2005 | Trinkel | H04M 3/53366 379/88.22 |
| 2005/0114759 | A1* | 5/2005 | Williams | G06Q 10/10 715/221 |
| 2005/0278413 | A1* | 12/2005 | Tannenbaum | G06Q 10/107 709/202 |
| 2006/0149825 | A1* | 7/2006 | Kim | H04L 51/04 709/207 |
| 2007/0060193 | A1* | 3/2007 | Kim | H04M 1/72555 455/550.1 |
| 2007/0124387 | A1* | 5/2007 | Galloway | H04L 51/04 709/206 |
| 2007/0198925 | A1* | 8/2007 | He | G06F 17/24 715/234 |
| 2007/0238489 | A1* | 10/2007 | Scott | G06F 3/03549 455/566 |
| 2008/0005253 | A1* | 1/2008 | Vincent | H04L 51/04 709/206 |
| 2008/0040433 | A1* | 2/2008 | Glasgow | G06Q 10/107 709/206 |
| 2008/0147651 | A1* | 6/2008 | Bhogal | G06F 17/276 |
| 2008/0208984 | A1* | 8/2008 | Rosenberg | H04L 51/04 709/206 |
| 2008/0291899 | A1* | 11/2008 | Gromoll | G06Q 10/107 370/352 |
| 2008/0311935 | A1* | 12/2008 | Tysowski | H04L 51/04 455/466 |
| 2009/0005011 | A1* | 1/2009 | Christie | G06Q 10/107 455/412.2 |
| 2009/0150803 | A1* | 6/2009 | Ross | G06Q 10/107 715/758 |
| 2009/0157570 | A1* | 6/2009 | Pall | G06F 21/6218 706/11 |
| 2009/0177981 | A1* | 7/2009 | Christie | G06F 3/04883 715/758 |
| 2009/0228842 | A1* | 9/2009 | Westerman | G06F 3/04883 715/863 |
| 2009/0235167 | A1* | 9/2009 | Boyer | G06F 16/951 715/708 |
| 2010/0004031 | A1* | 1/2010 | Kim | H04M 1/72583 455/566 |
| 2010/0077300 | A1* | 3/2010 | Dugan | G06F 16/9562 715/273 |
| 2010/0162133 | A1* | 6/2010 | Pascal | H04M 1/72547 715/752 |
| 2010/0205543 | A1* | 8/2010 | Von Werther | H04L 12/1818 715/753 |
| 2010/0332518 | A1* | 12/2010 | Song | G06F 3/0483 707/769 |
| 2011/0053578 | A1* | 3/2011 | Rochford | H04M 3/42153 455/418 |
| 2011/0107382 | A1* | 5/2011 | Morris | H04N 21/4788 725/109 |
| 2011/0219316 | A1* | 9/2011 | Lee | G06Q 10/107 715/752 |
| 2011/0289011 | A1* | 11/2011 | Hull | G06Q 10/107 705/319 |
| 2012/0072856 | A1* | 3/2012 | Park | H04L 51/043 715/752 |
| 2012/0190388 | A1* | 7/2012 | Castleman | H04L 51/04 455/466 |
| 2012/0209860 | A1* | 8/2012 | Gummagatta | G06Q 10/109 707/748 |
| 2012/0266250 | A1* | 10/2012 | Uhl | G06F 21/6254 726/26 |
| 2012/0281011 | A1* | 11/2012 | Reichenstein | G06F 17/211 345/596 |
| 2013/0018957 | A1* | 1/2013 | Parnaby | G06Q 50/01 709/204 |
| 2013/0093833 | A1* | 4/2013 | Al-Asaaed | H04L 51/10 348/14.02 |

(56) References Cited

U.S. PATENT DOCUMENTS

| | | | |
|---|---|---|---|
| 2013/0159830 A1* | 6/2013 | Lee | G06F 17/2241 715/208 |
| 2013/0185363 A1* | 7/2013 | DeLuca | H04L 51/04 709/206 |
| 2014/0032672 A1* | 1/2014 | Yoshikawa | H04W 4/21 709/204 |
| 2014/0085487 A1* | 3/2014 | Park | G06F 3/04883 348/207.1 |
| 2014/0092130 A1* | 4/2014 | Anderson | G06F 3/011 345/632 |
| 2014/0143346 A1* | 5/2014 | Mahmud | G06Q 30/0201 709/206 |
| 2014/0164305 A1* | 6/2014 | Lynch | G06Q 30/0201 706/46 |
| 2014/0337729 A1* | 11/2014 | Jang | G06Q 10/00 715/716 |
| 2015/0067514 A1* | 3/2015 | Lewis | G11B 27/031 715/720 |
| 2015/0263996 A1* | 9/2015 | Abate | H04L 51/04 715/753 |
| 2015/0264003 A1* | 9/2015 | Bostick | H04L 51/22 709/206 |
| 2015/0277686 A1* | 10/2015 | LaForge | H04L 67/10 715/723 |
| 2015/0312185 A1* | 10/2015 | Langholz | G06F 3/16 348/14.03 |
| 2015/0319127 A1* | 11/2015 | Allen | H04L 51/36 709/206 |
| 2015/0324100 A1* | 11/2015 | Greenberg | G06F 17/212 715/765 |
| 2015/0332062 A1* | 11/2015 | McReynolds | H04L 51/32 726/28 |
| 2015/0334072 A1* | 11/2015 | Agarwal | H04L 51/24 715/753 |
| 2016/0014063 A1* | 1/2016 | Hogeg | H04N 21/41407 455/466 |
| 2016/0055659 A1 | 2/2016 | Wilson et al. | |
| 2016/0103564 A1* | 4/2016 | Chao | G06F 16/23 715/825 |
| 2016/0150268 A1* | 5/2016 | Barablin | H04N 21/4312 725/37 |
| 2016/0150387 A1* | 5/2016 | Myers | H04W 4/14 455/466 |
| 2016/0162172 A1* | 6/2016 | Rathod | G06F 3/0481 715/747 |
| 2016/0216866 A1* | 7/2016 | Zeung | G06F 3/1454 |
| 2016/0216953 A1* | 7/2016 | Pu | G06F 8/61 |
| 2016/0255024 A1* | 9/2016 | Tichauer | H04L 51/24 709/206 |
| 2016/0259526 A1* | 9/2016 | Lee | G06F 3/04817 |
| 2016/0285791 A1* | 9/2016 | Teng | H04L 51/04 |
| 2016/0291822 A1* | 10/2016 | Ahuja | H04L 51/10 |
| 2016/0301639 A1* | 10/2016 | Liu | G06Q 50/01 |
| 2016/0352672 A1* | 12/2016 | Bai | H04L 51/32 |
| 2017/0048817 A1* | 2/2017 | Yang | H04W 4/12 |
| 2017/0206420 A1* | 7/2017 | She | G06Q 50/01 |
| 2017/0288887 A1* | 10/2017 | Wang | G06F 3/0482 |
| 2017/0336960 A1* | 11/2017 | Chaudhri | G06F 3/04817 |
| 2017/0337176 A1* | 11/2017 | Cietwierkowski | G06F 40/253 |
| 2017/0364599 A1* | 12/2017 | Ohanyerenwa | H04L 67/2804 |
| 2018/0097902 A1* | 4/2018 | Meixner | H04L 51/04 |
| 2018/0181265 A1* | 6/2018 | Kim | H04L 51/04 |
| 2018/0189250 A1* | 7/2018 | Lee | G06Q 10/101 |
| 2018/0219810 A1* | 8/2018 | Santos Ramirez | H04L 51/14 |
| 2018/0225263 A1* | 8/2018 | Zhong | G06F 17/212 |
| 2018/0366119 A1* | 12/2018 | Li | G06F 3/167 |

FOREIGN PATENT DOCUMENTS

| | | |
|---|---|---|
| CN | 106302097 | 1/2017 |
| TW | 201015959 | 4/2010 |
| TW | 201614488 | 4/2016 |

OTHER PUBLICATIONS

"Office Action of China Counterpart Application", dated Nov. 4, 2020, p. 1-p. 14.

* cited by examiner

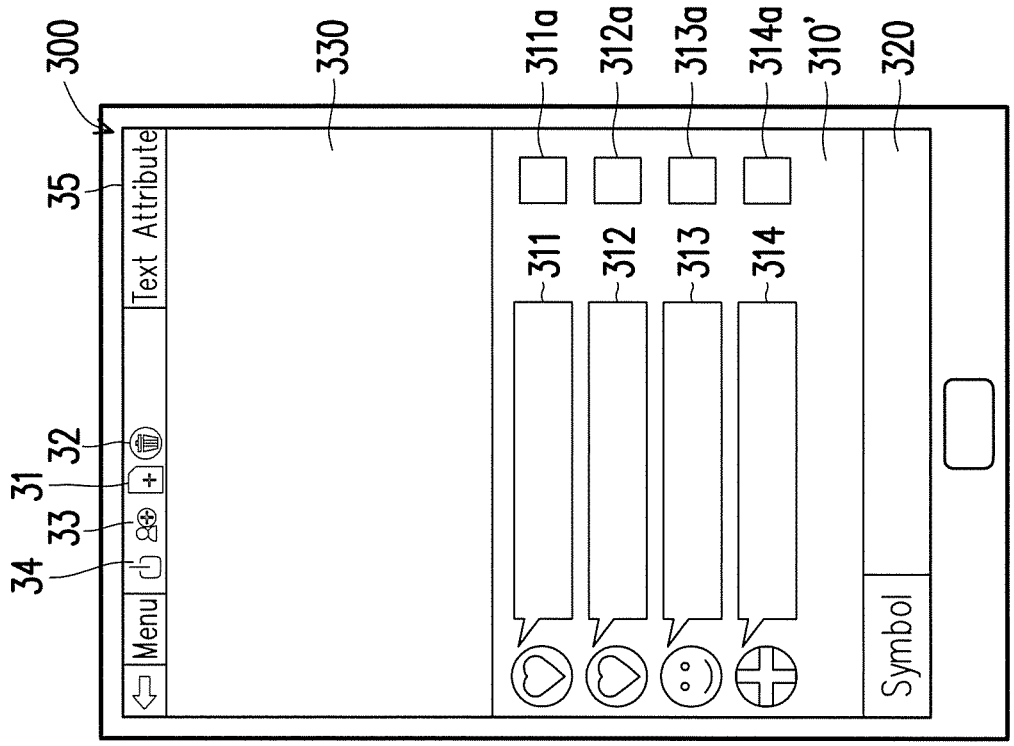
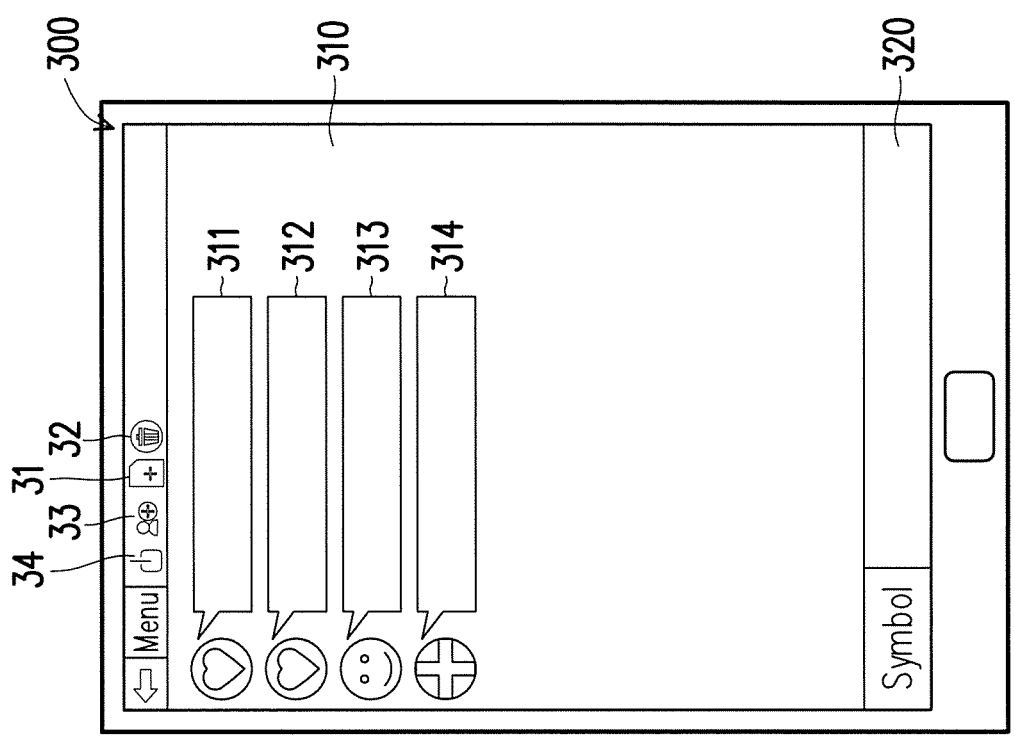
FIG. 3B
FIG. 3A

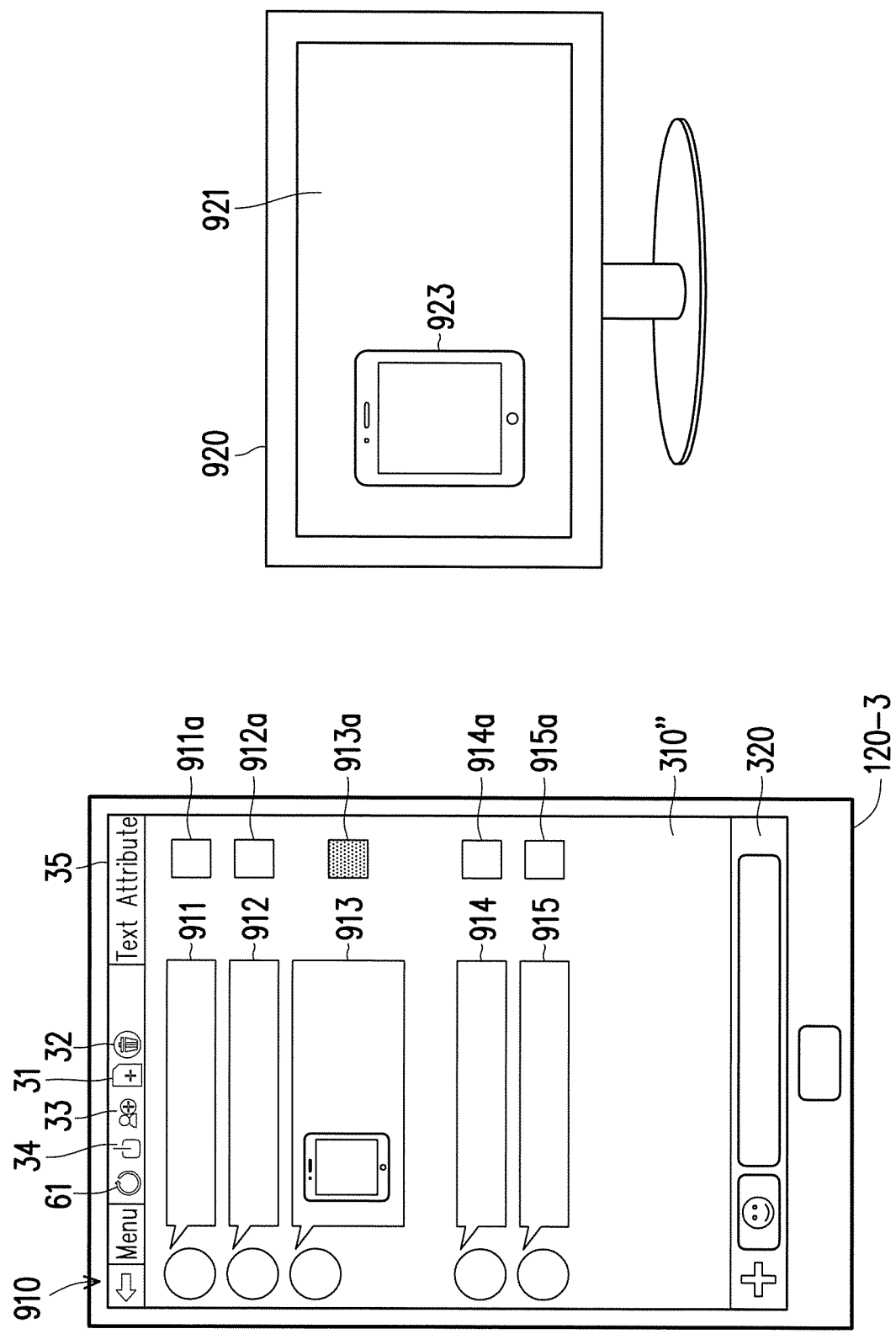

INSTANT MESSAGING METHOD AND SYSTEM, AND ELECTRONIC APPARATUS

CROSS-REFERENCE TO RELATED APPLICATION

This application claims the priority benefit of Taiwan application serial no. 106112490, filed on Apr. 14, 2017. The entirety of the above-mentioned patent application is hereby incorporated by reference herein and made a part of this specification.

BACKGROUND OF THE INVENTION

1. Field of the Invention

The invention relates to instant messaging. More particularly, the invention relates to an instant messaging method and system, and an electronic apparatus for performing editing on message contents.

2. Description of Related Art

Instant messaging (abbr. as IM) is a system to perform real-time communication over the Internet. In the system, two or more people are allowed to transmit text messages, files, voices, and videos to make exchanges in real time by using the Internet. The instant messaging service is provided most of the time through a website, computer software, and a mobile application.

With popularity of Smartphones increases, people rely more and more on the instant messaging software in the Smartphones to communicate with one another. In the existing instant messaging software, the users are allowed to communicate with one another but are not allowed to edit messaging contents at the same time. Messaging content editing can only be achieved through the use of other editor programs. Nevertheless, the existing editor programs are designed mostly based on operations of conventional personal computers, it is thus can be seen that the editor programs are not to be used easily. Thereby, if functions of the instant messaging software can be added to allow messaging and editing to be performed at the same time, usability of the instant messaging software may be significantly enhanced.

SUMMARY OF THE INVENTION

The invention provides an instant messaging method and system, and an electronic apparatus for providing function to edit a message content in an instant messaging interface to enhance usability.

An instant messaging method provided by an embodiment of the invention includes following steps. An instant messaging interface is activated in an electronic apparatus. At least one message content is displayed in the instant messaging interface. After the instant messaging interface triggers an edit mode, a preview area is added to the instant messaging interface, and after one of the message contents in the instant messaging interface is determined to be selected as an edited target, a message content object corresponding to the selected edited target is displayed in the preview area of the instant messaging interface. A touch operation corresponding to the edited target is received in the instant messaging interface, and attribute data is generated based the touch operation. The message content object corresponding to the selected edited target is adjusted in the preview area based on the attribute data.

In an embodiment of the invention, the step of receiving the touch operation corresponding to the edited target in the instant messaging interface includes: setting an initial touch position of the touch operation as an initial point after determining the touch operation is received within a touch range corresponding to the edited target and setting the initial point as a reference point of a gesture; enlarging the touch range, continuously receiving the touch operation within the enlarged touch range; determining whether another touch operation corresponding to the edited target is received within the enlarged touch range in the predetermined time after the touch operation is released; and setting an initial touch position of the another touch operation as the initial point after determining the another touch operation is received within the enlarged touch range in the predetermined time, resetting the initial point as the reference point of the gesture and continuously receiving another touch operation in the enlarged touch range.

In an embodiment of the invention, after the instant messaging interface is activated in the electronic apparatus, and after the viewing mode is triggered by the instant messaging interface, another attribute data is received from another electronic apparatus corresponding to a followed connection account in the edit mode when the instant messaging interface triggers a viewing mode, and a corresponding content is displayed based on the another attribute data corresponding to the followed connection account in the preview area of the instant messaging interface.

In an embodiment of the invention, the instant messaging method further includes: notifying a server through the electronic apparatus when the instant messaging interface triggers the viewing mode such that the server marks a role tag of the electronic apparatus as a follower tag and notifies other electronic apparatuses communicating with the electronic apparatus, and notifying the server through the electronic apparatus when the instant messaging interface triggers the edit mode such that the server marks the role tag of the electronic apparatus as an editor tag and notifies other electronic apparatuses communicating with the electronic apparatus.

In an embodiment of the invention, the instant messaging method further includes: when a server determines a follower account in a plurality of connection accounts triggers the viewing mode and sets the electronic apparatus as a followed connection account, transmitting the attribute data corresponding to the edited target through the server to another electronic apparatus corresponding to the follower account.

In an embodiment of the invention, the instant messaging method further includes: displaying the preview area in an external display when detecting the electronic apparatus being connected to the external display.

The instant messaging system provided by the embodiments of the invention includes a plurality of electronic apparatuses. Each of the electronic apparatuses includes a first networking device, a first storage device, and a first processor. The server includes a second networking device, a second storage device, and a second processor. In the electronic apparatus, the first storage device includes an instant messaging module, and the first processor is coupled to the first networking device and the first storage device and drives the instant messaging module to perform an instant messaging process. The instant messaging process includes: activating an instant messaging interface, wherein at least one message content is displayed in the instant messaging interface; adding a preview area to the instant messaging interface after the instant messaging interface triggers an edit mode, after one of the message contents in the instant messaging interface is determined to be selected as an edited target, displaying a message content object corresponding to the selected edited target in the preview area of the instant messaging interface; receiving a touch operation corresponding to the edited target in the instant messaging interface and generating attribute data based on the touch operation; and adjusting the message content object corresponding to the selected edited target in the preview area based on the attribute data.

The electronic apparatus provided by the embodiments of the invention includes: a networking device, a storage device, and a processor. The storage device includes an instant messaging module. The processor is coupled to the networking device and the storage device and drives the instant messaging module to perform an instant messaging process. The instant messaging process includes: activating an instant messaging interface, wherein at least one message content is displayed in the instant messaging interface; adding a preview area to the instant messaging interface after the instant messaging interface triggers an edit mode and after one of the message contents in the instant messaging interface is determined to be selected as an edited target, displaying a message content object corresponding to the selected edited target in the preview area of the instant messaging interface; receiving a touch operation corresponding to the edited target in the instant messaging interface and generating attribute data based on the touch operation; and adjusting the message content object corresponding to the selected edited target in the preview area based on the attribute data.

In view of the foregoing, a user is able to synchronously perform editing when communicating through providing the edit mode in the instant messaging interface. Moreover, the contents being edited may be presented by providing the preview area. As such, operating and editing on the instant messaging interface become easier. In addition, by utilizing the characteristic of communications conducted among users, opinions on the edited contents from other users may be obtained instantly. Moreover, the users may also assist in editing. As such, an editing scheme is completed in line with expectations from all sides:

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A and FIG. 3B are schematic diagrams of an instant messaging interface according to an embodiment of the invention.

FIG. 9 is a schematic diagram of an electronic apparatus according to another embodiment of the invention.

DESCRIPTION OF THE EMBODIMENTS

Figure 1:
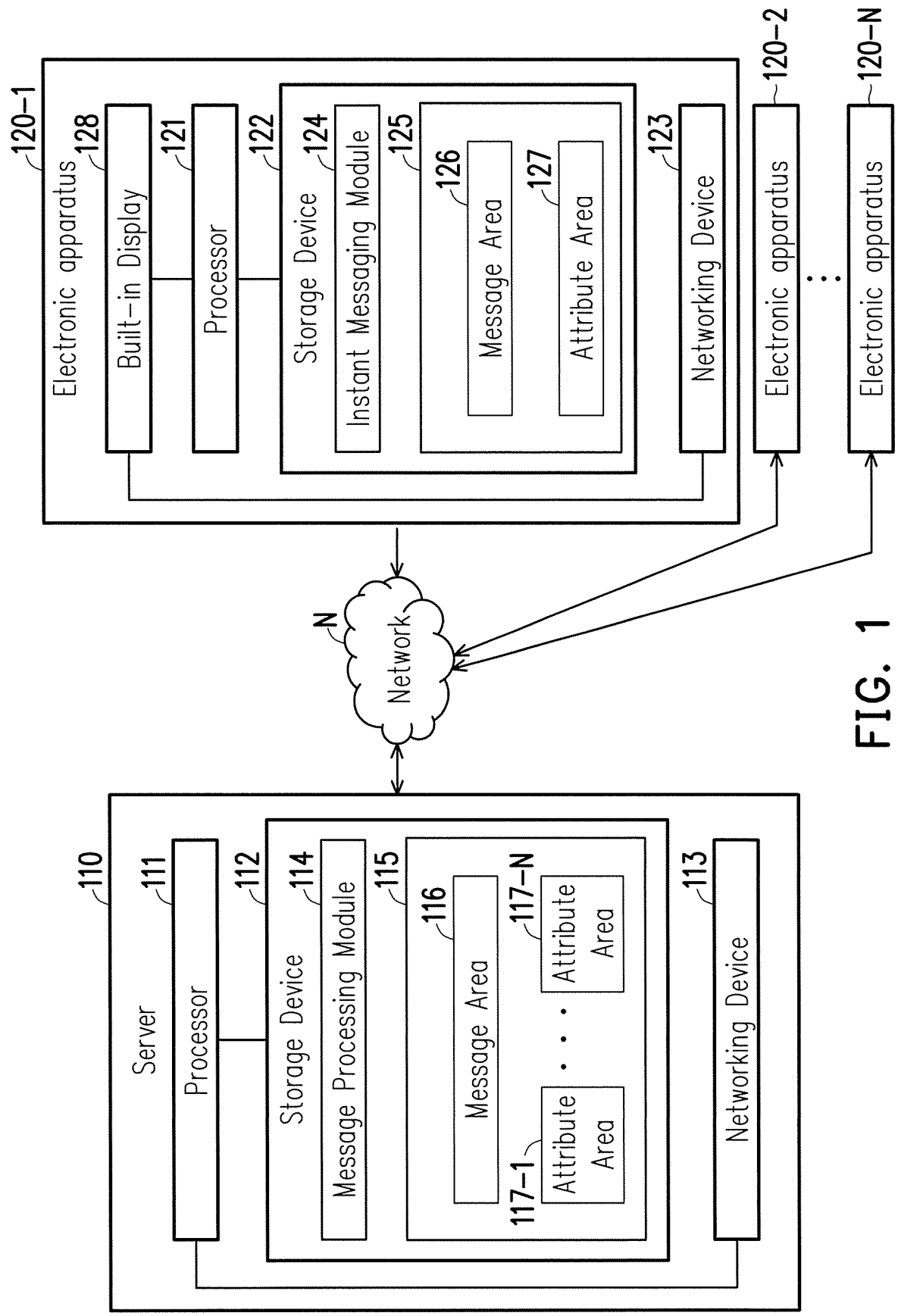
FIG. 1 is a block diagram of an instant messaging system according to an embodiment of the invention.

FIG. 1 is a block diagram of an instant messaging system according to an embodiment of the invention. Referring to FIG. 1, an instant messaging system includes a server 110 and a plurality of electronic apparatuses 120-1 to 120-N. The server 110 is connected to the electronic apparatuses 120-1 to 120-N through a network N. The server 110 includes a processor 111, a storage device 112, and a networking device 113.

The electronic apparatuses 120-1 to 120-N are, for example, Smartphones. In other embodiments, the electronic apparatuses 120-1 to 120-N may be desktop computers, notebooks, tablet PCs, etc. Merely an internal structure of the electronic apparatus 120-1 is described herein in order to facilitate the illustration, and internal structures of the rest of the electronic apparatuses 120-2 to 120-N are substantially similar to that of the electronic apparatus 120-1. The same descriptions will not be repeated hereinafter. The electronic apparatus 120-1 includes a processor 121, a storage device 122, a networking device 123, and a built-in display 128.

Each of the processor 111 and the processor 121 is, for example, a central processing unit (CPU), a graphic processing unit (GPU), a physics processing unit (PPU), a programmable microprocessor, an embedded control chip, a digital signal processor (DSP), an application specific integrated circuits (ASIC), or other similar devices. Each of the storage device 112 and the storage device 122 is, for example, fixed or movable random access memory (RAM) of any types, read-only memory (ROM), flash memory, a secure digital memory card (SD), other similar devices, or a combination of the foregoing devices.

Each of the networking device 113 and the networking device 123 is, for example, a network card. The network card provides a WiFi module, a wireless lan (WLAN) module, a third generation of wireless mobile telecommunications technology (3G) module, a fourth generation of wireless mobile telecommunications technology (4G) module, or a long term evolution (LTE) module.

In the server 110, the processor 111 is coupled to the storage device 112 and the networking device 113. The networking device 113 is connected to the electronic apparatuses 120-1 to 120-N through the network N. The storage device 112 includes a message processing module 114 and a data storage area 115. The data storage area 115 includes a message area 116 and a plurality of attribute areas 117-1 to 117-N. The message area 116 is configured to store message contents of the electronic apparatuses 120-1 to 120-N. The attribute areas 117-1 to 117-N are configured to respectively store attribute data uploaded by the electronic apparatuses 120-1 to 120-N. The message contents include at least one of text messages, pictures, voice files, and videos. The processor 111 drives the message processing module 114 to perform a processing process. The processing process of the server 110 includes receiving the attribute data respectively from the electronic apparatuses 120-1 to 120-N through the networking device 113 and storing the attribute data to storage areas corresponding to the electronic apparatuses 120-1 to 120-N of the storage device 112, i.e., the attribute areas 117-1 to 117-N.

All of the message contents transmitted from the electronic apparatuses 120-1 to 120-N are first stored in the message area 116 of the server 110 and then are sent to other electronic apparatuses involved in a group conversation. In order to synchronize the message contents, a set of the message contents shared by all of connection accounts involved in the conversation is stored in the message area 116 of the server 110 for synchronization usage.

In the electronic apparatus 120-1, the processor 121 is coupled to the storage device 122, the networking device 123, and the built-in display 128. The built-in display 128 is, for example, a display with touch function. The networking device 123 is connected to the networking device 113 of the server 110 through the network N. The storage device 122 includes an instant messaging module 124 and a data storage area 125. The data storage area 125 includes a message area 126 and an attribute area 127. The processor 121 drives the instant messaging module 124 to perform an instant messaging process (i.e., the instant messaging method described as follows).

Figure 2:
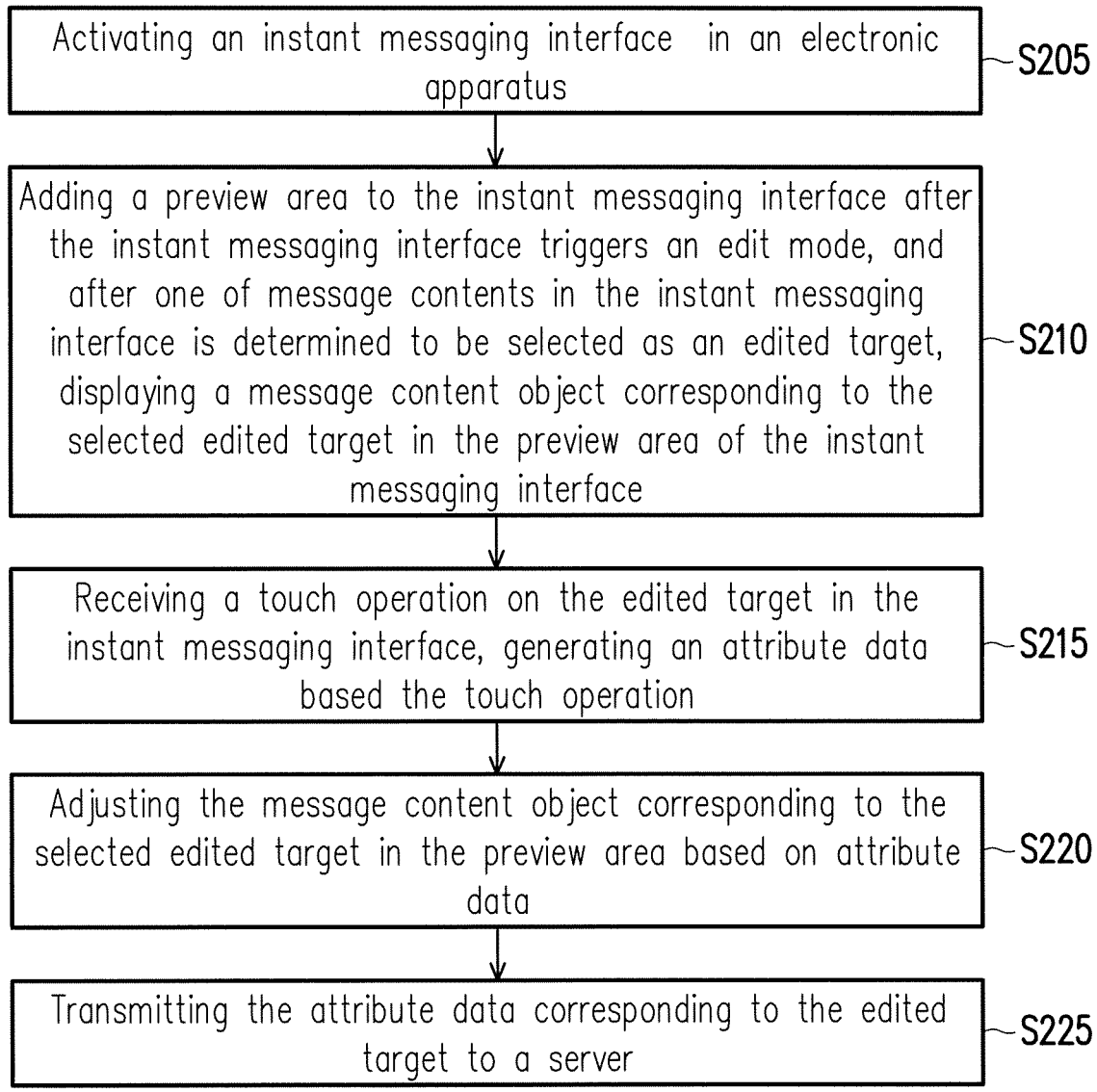
FIG. 2 is a flowchart of an instant messaging method according to an embodiment of the invention.

FIG. 2 is a flowchart of an instant messaging method according to an embodiment of the invention. Referring to FIG. 1 and FIG. 2, in step S205, an instant messaging interface is activated in the electronic apparatus 120-1. At least one message content is displayed in the instant messaging interface. Here, the instant messaging interface is displayed on the built-in display 128. Instant messaging interface provides a pure message mode and an edit mode and is predetermined to enter the pure message mode when the instant messaging interface is activated.

In step S210, after the edit mode is triggered by the instant messaging interface, a preview area is added to the instant messaging interface. After one of the message contents in the instant messaging interface is determined to be selected as an edited target, a message content object corresponding to the selected edited target is displayed in the preview area of the instant messaging interface.

Besides, the instant messaging interface provides a pure message mode. After the pure message mode is triggered by the instant messaging interface, a communication area is displayed in the instant messaging interface, and the message contents are displayed through the communication area. Moreover, in the edit mode, touch edit function of the communication area is activated by the processor 121, such that a user is able to perform editing in the communication area, and an edited content is displayed in the preview area. Examples of the instant messaging interface in the pure message mode and in the edit mode are described as follows.

FIG. 3A and FIG. 3B are schematic diagrams of an instant messaging interface according to an embodiment of the invention. FIG. 3A presents an instant messaging interface in the pure message mode, and FIG. 3B presents an instant messaging interface in the edit mode. In the pure message mode, as shown in FIG. 3A, a communication area 310 and an input area 320 are displayed in an instant messaging interface 300. Text messages, pictures, voice files, or videos, etc. may be inputted by the user through the input area 320. A plurality of message contents 311 to 314 between a connection account used by the electronic apparatus 120-1 and connection accounts used by the rest of the electronic apparatuses 120-2 to 120-N are displayed through the communication area 310.

The instant messaging interface 300 further includes an edit button 31, a cancel button 32, an invite button 33, and an upload button 34. The edit mode is entered by triggering the edit button 31. The pure message mode is being switched to through the cancel button 32. Other connection accounts are invited to join a group conversation by the invite button 33. The edited message contents are uploaded to the server 110, a social networking website, or cloud device, etc. by the upload button 34.

When the edit button 31 is triggered to enter the edit mode, as shown in FIG. 3B, a communication area 310' and a preview area 330 are displayed in the instant messaging interface 300. A size of the communication area 310' in the edit mode is less than a size of the communication area 310 in the pure message mode. Furthermore, a plurality of selection boxes 311a to 314a can be added corresponding to the message contents 311 to 314 in the communication area 310' in the edit mode. As such, the user is able to select from the message contents 311 to 314. In other embodiments, other methods can be used for the user to select message contents.

In addition, the instant messaging interface 300 in the edit mode further includes a text attribute button 35. The text attribute bottom 35 can be triggered to call an attribute adjustment box. Sizes, fonts, colors, layering relations, and other attributes of a message content object (e.g. the corresponding message contents thereof are text messages) presented in the preview area 330 may be adjusted in the attribute adjustment box. For instance, the color of the texts in the message content object can be adjusted to red, the font in the message content object can be adjusted to "Times New Roman", and an order of the message content object can be moved to an upper layer, etc.

Figure 4:
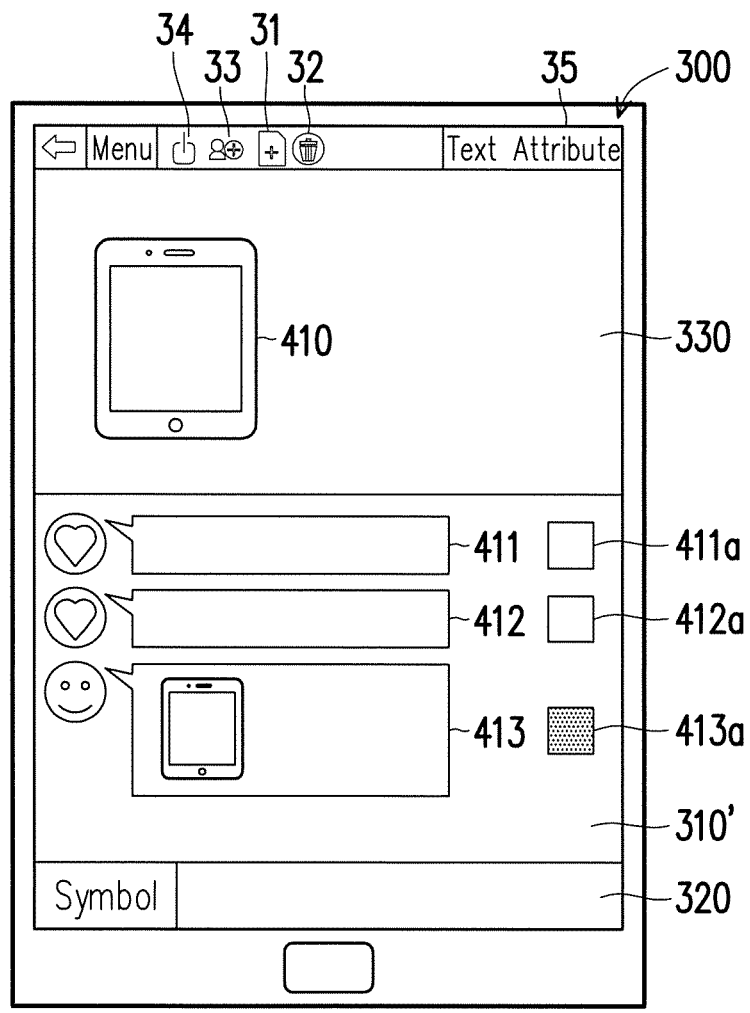
FIG. 4 is a schematic diagram of an instant messaging interface in an edit mode according to an embodiment of the invention.

In the edit mode, after one of the message contents in the communication areas 310' is determined to be selected as the edited target, a message content object corresponding to the selected edited target is added to the preview area 330. For instance, FIG. 4 is a schematic diagram of an instant messaging interface in an edit mode according to an embodiment of the invention. In FIG. 4, the communication area 310' includes message contents 411 to 413 respectively having corresponding selection boxes 411a to 413a. Here, after the selection box 413a is clicked to select the message content 413 as the edited target, a message content object 410 corresponding to the message content 413 synchronously appears in the preview area 330.

Next, in step S215, a touch operation corresponding to the edited target is received in the instant messaging interface 300, and attribute data is generated based on the touch operation. Referring to FIG. 4, a touch operation corresponding to the edited target is received in the communication area 310', and attribute data is generated based on the touch operation. For instance, a zooming gesture, a moving gesture, a rotating gesture, and other actions, may be performed to the edited target, or an attribute of the message content object may be adjusted through the attribute adjustment box. The corresponding attribute data is generated according to the touch operation, and the attribute data is stored in the data storage area 125 by the processor 121. For instance, the attribute data is stored in the attribute area 127.

Figure 5:
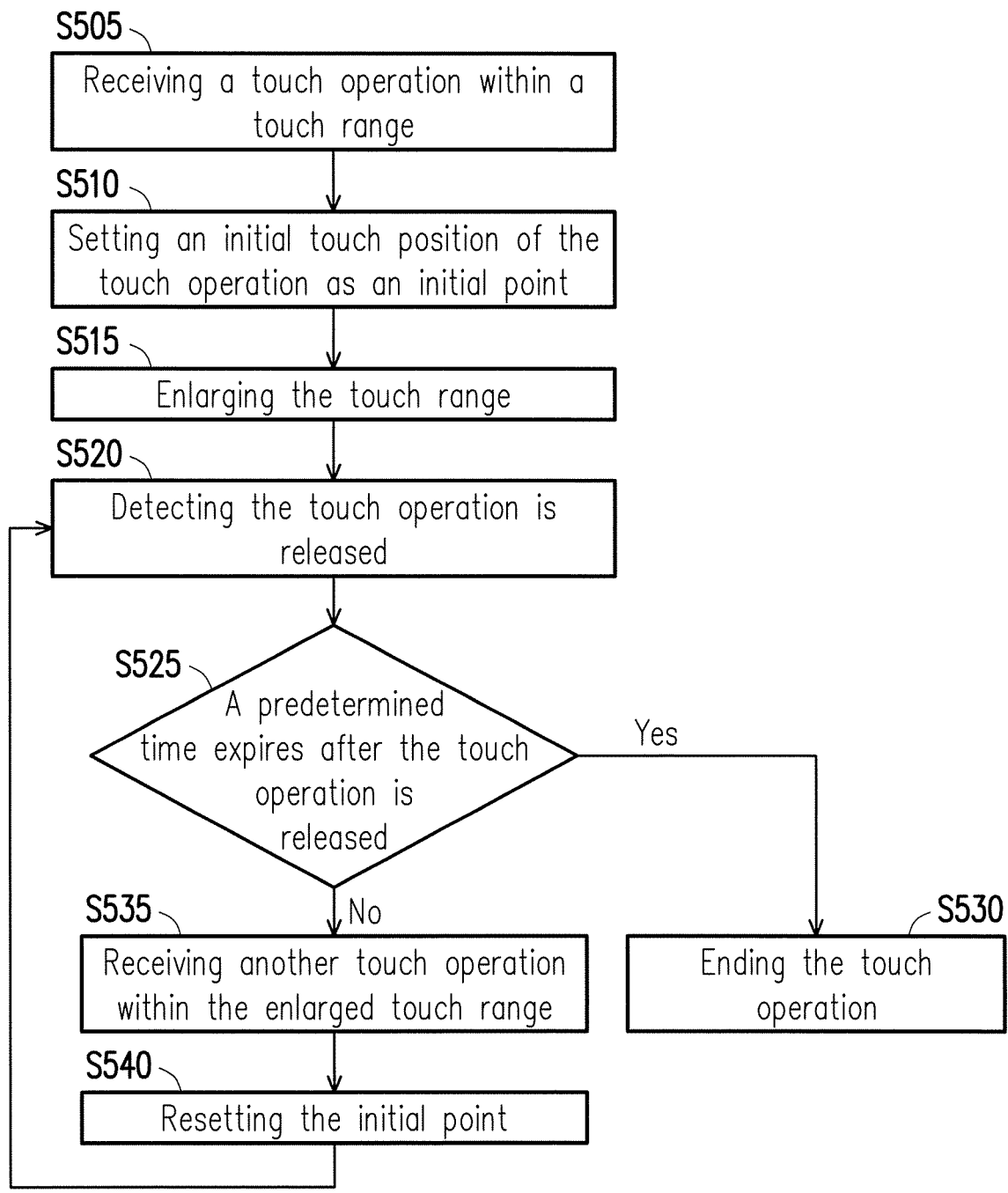
FIG. 5 is a flowchart of a method for performing a touch operation corresponding to an edited target according to an embodiment of the invention.

The touch operation corresponding to the edited target is described as follows. FIG. 5 is a flowchart of a method for performing a touch operation corresponding to an edited target according to an embodiment of the invention. Referring to FIG. 5, in step S505, the processor 121 determines that a touch operation is received within a touch range corresponding to an edited target in a communication area. For instance, a range of an entire dialog box of the edited target is configured as a predetermined touch range. In the case of the message content 413 in FIG. 4, a range covering the entire dialog box is a touch range of the message content 413.

After the touch operation is determined to be received within the touch range corresponding to the edited target, in step S510, an initial touch position of the touch operation is set as an initial point, and the initial point is served as a reference point of a gesture. For instance, the initial point is served as the reference point of each of the gestures of zooming, moving, rotating, etc.

Next, in step S515, the touch range is enlarged, and the touch operation is continuously received within the enlarged touch range. Specifically, after the initial point is obtained, the touch range is enlarged by the processor 121 for the user to easily perform gestures on. For instance, the touch range may be enlarged to cover the entire communication area 310', i.e., the entire communication area 310' is the touch range. Nevertheless, the above illustration is merely exemplary, and the invention is not limited thereto.

Next, in step S520, it is detected that the touch operation is released. Furthermore, after the touch operation is released, in step S525, whether a predetermined time expires after the touch operation is released is determined. If the predetermined time expires after the touch operation is released, the touch operation is ended as shown in step S530. The enlarged touch range corresponding to the edited target is restored as the original touch range. On the other hand, if the predetermined time does not expire after the touch operation is released, and in step S535, another touch operation is received in the enlarged touch range, step S540 is proceeded, and the initial point is reset. In other words, said initial point is reset to act as the reference point of the gestures, and the touch operation corresponding to the edited target is continuously received in the enlarged touch range.

In other words, when another touch operation is determined to be received within the touch range corresponding to the edited target in the predetermined time, an initial touch position of the another touch operation is set as an initial point, and said initial point is reset to act as the reference point of the gestures so as to continuously receive yet another touch operation within the enlarged touch range. For instance, it is assumed that the initial point set at the beginning is too close to an edge of the enlarged touch area (e.g., the communication area 310'), and thus a moving range is too small for performing a moving operation; nevertheless, when the moving operation is moved to the edge of the communication area 310', the initial point may be reset by re-touching other positions in the predetermined time, and the same moving operation may be continued. Alternatively, if the touch operation is a zooming gesture, the initial point may be reset through touching other positions in the predetermined time, and the same zooming gesture may be continued to continuously zoom out or zoom in the corresponding message content object. As such, the touch operation may be performed in a limited space.

Referring back to FIG. 2, in step S220, the message content object corresponding to the selected edited target in the preview area is adjusted based on the attribute data by the processor 121. For instance, when a zoom-out gesture is performed to the edited target (e.g., the message content 413) by the user in the communication area 310', the corresponding message content object 410 in the preview area 330 is zoomed out as well.

Afterwards, in step S225, the attribute data corresponding to the edited target is transmitted to the server 110 through the networking device 123 of the electronic apparatus 120-1. For instance, when the upload button 34 is triggered, the attribute data stored in the attribute area 127 of the electronic apparatus 120-1 is transmitted to the server 110, and the attribute data of the electronic apparatus 120-1 is stored into the attribute area 117-1 corresponding to the electronic apparatus 120-1 in the server 110. In addition, the attribute data may also be uploaded to the server 110 when the predetermined time expires after the touch operation is released.

In addition, when two or more message contents are selected as the edited targets, two corresponding message content objects are shown in the preview area 330. As the touch operation is performed to different edited targets by the user in the communication area 310', overlapping between message content objects which may cause the message content objects become hard to control is thus avoided when the touch operation is performed directly to the displayed message content objects. For instance, when the message content 312 and the message content 314 act as the edited targets, and a message content object X and a message content object Y are correspondingly displayed in the preview area 330. As no overlapping problem may occur in the message contents in the communication area 310', the operation is thus easy to be performed. Thereby, the touch operations may be respectively performed to the message content object X and the message content object Y corresponding to the message content 312 and the message content 314 according to step S505 to step S540.

In other embodiments, the viewing mode may be further provided by the instant messaging interface. Communication among a number of users (a plurality of connection accounts) can be conducted in the instant messaging interface, and editing can be performed in respective communication area without interfering with one another. Alternatively, one of the connection accounts (the followed connection account) may be selected to be viewed when performing editing and to provide opinions. In other words, the user may edit message contents of a group conversation by himself/herself, or the user may view the message contents being edited by other users in the group. Another embodiment is illustrated in the following.

Figure 6:
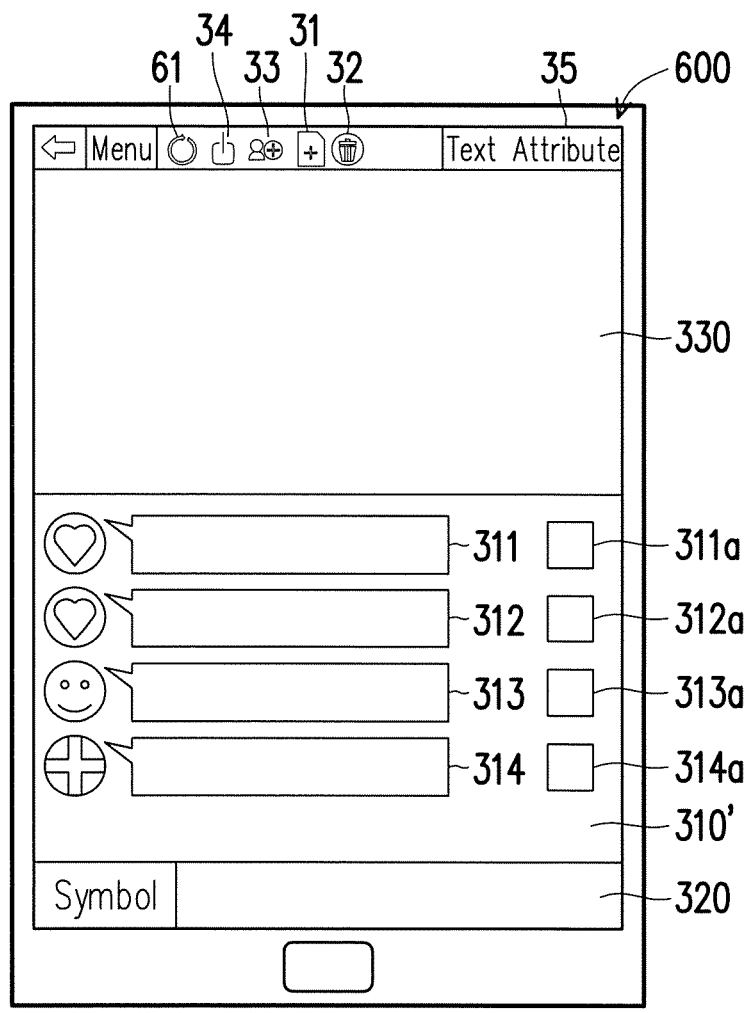
FIG. 6 is a schematic diagram of an instant messaging interface according to another embodiment of the invention.

FIG. 6 is a schematic diagram of an instant messaging interface according to another embodiment of the invention. FIG. 6 shows an instant messaging interface 600 entered the edit mode or the viewing mode, and the instant messaging interface 600 includes the edit button 31, the cancel button 32, the invite button 33, and the upload button 34, the attribute button 35, and a view button 61. When the user selects the view button 61, the electronic apparatus 120-1 enters the viewing mode, and a followed target is selected (e.g., a connection account of the electronic apparatus 120-2 is selected as the followed connection account). Another attribute data uploaded through the followed connection account of the followed target in the edit mode is received from the server 110 and is displayed in the preview area of the instant messaging interface based on another attribute data. It is assumed that the electronic apparatus 120-2 is the followed target, attribute data corresponding to the electronic apparatus 120-2 is transmitted to the electronic apparatus 120-1 by the server 110, such that content being edited by the electronic apparatus 120-2 is displayed in the preview area of the electronic apparatus 120-1.

Figure 7:
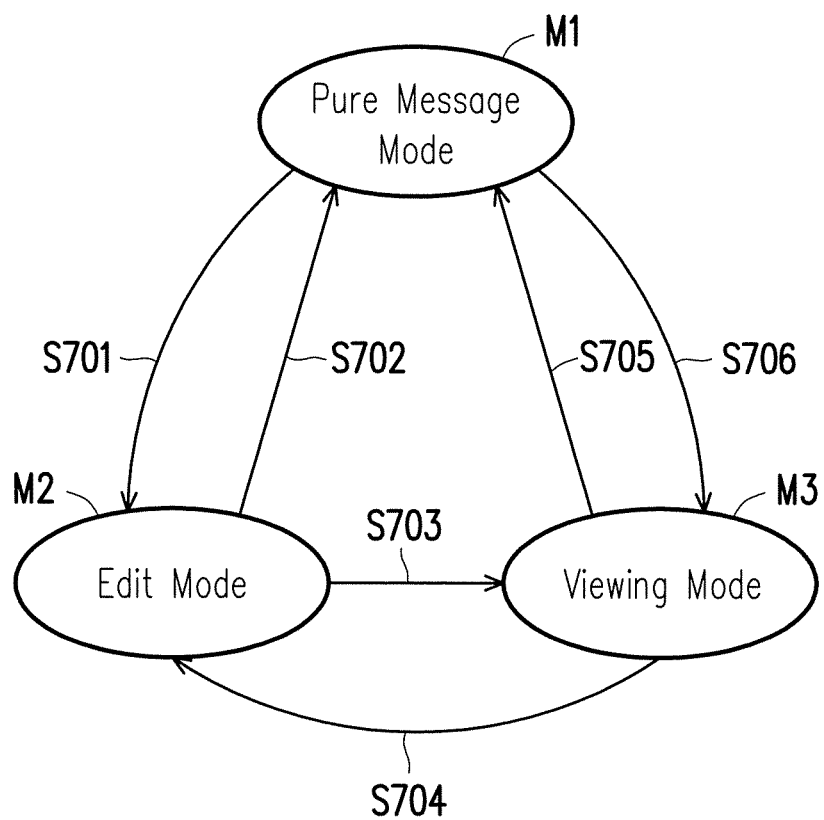
FIG. 7 is a schematic diagram of mode switching according to an embodiment of the invention.

Examples of switching methods among the pure message mode, the edit mode, and the viewing mode are described as follows. FIG. 7 is a schematic diagram of mode switching according to an embodiment of the invention. Referring to FIG. 6 and FIG. 7, the instant messaging interface 600 enters a pure message mode M1 when the instant messaging interface 600 is activated. In the pure message mode M1, in step S701, when the edit button 31 is detected to be triggered, the pure message mode M1 is switched to an edit mode M2. In addition, in the pure message mode M1, in step S706, when the view button 61 is detected to be triggered, the pure message mode M1 is switched to a viewing mode M3.

In the edit mode M2, in step S702, when the cancel button 32 is detected to be triggered, the edit mode M2 is switched to the pure message mode M1. In the edit mode M2, in step S703, when the view button 61 is detected to be triggered, the edit mode M2 is switched to the viewing mode M3.

In the viewing mode M3, in step S704, when the edit button 31 is detected to be triggered, the viewing mode M3 is switched to the edit mode M2. In the viewing mode M3, in step S705, when the cancel button 32 is detected to be triggered, the viewing mode M3 is switched to the pure message mode M1.

Thereby, switching among the pure message mode M1, the edit mode M2, and the viewing mode M3 may be performed through the edit button 31, the view button 61, and the cancel button 32. An order from step S701 to step S706 is not limited.

In addition, when the electronic apparatus 120-1 enters the viewing mode, the server 110 is notified by the electronic apparatus 120-1. As such, a role tag of the electronic apparatus 120-1 is marked as a follower tag, and then the rest of the electronic apparatuses 120-2 to 120-N are notified by the server 110. When the electronic apparatus 120-1 enters the edit mode, the server 110 is notified by the electronic apparatus 120-1. As such, the role tag of the electronic apparatus 120-1 is marked as an editor tag, and then the rest of the electronic apparatuses 120-2 to 120-N are notified by the server 110. Accordingly, the role tags are used by the server 110 to manage the electronic apparatuses 120-1 to 120-N to act as editors or followers. Accordingly, role tag changes and mutual relation of the electronic apparatuses 120-1 to 120-N may be obtained instantly by the server 110. In addition, corresponding role tag marks of the electronic apparatuses 120-1 to 120-N may also be stored in the corresponding attribute area 117-1 to 117-N in the server 110.

When the server 110 determines that the viewing mode is triggered by one of the follower accounts (the follower) in the connection accounts and another connection account is set to be the followed connection account (the editor), attribute data corresponding to the followed connection account is sent to an electronic apparatus corresponding to the follower account through the server 110. Once the attribute data of the followed connection account is updated to the server 110, synchronization is performed between the follower account following the followed connection account and the followed connection account. When editing is performed by the followed connection account and is being viewed by other follower accounts, editing operation of the followed connection account is not affected by the follower accounts. Steps to synchronize messages between the editor (the followed connection account) and the follower (the follower account) are illustrated as follows.

Figure 8:
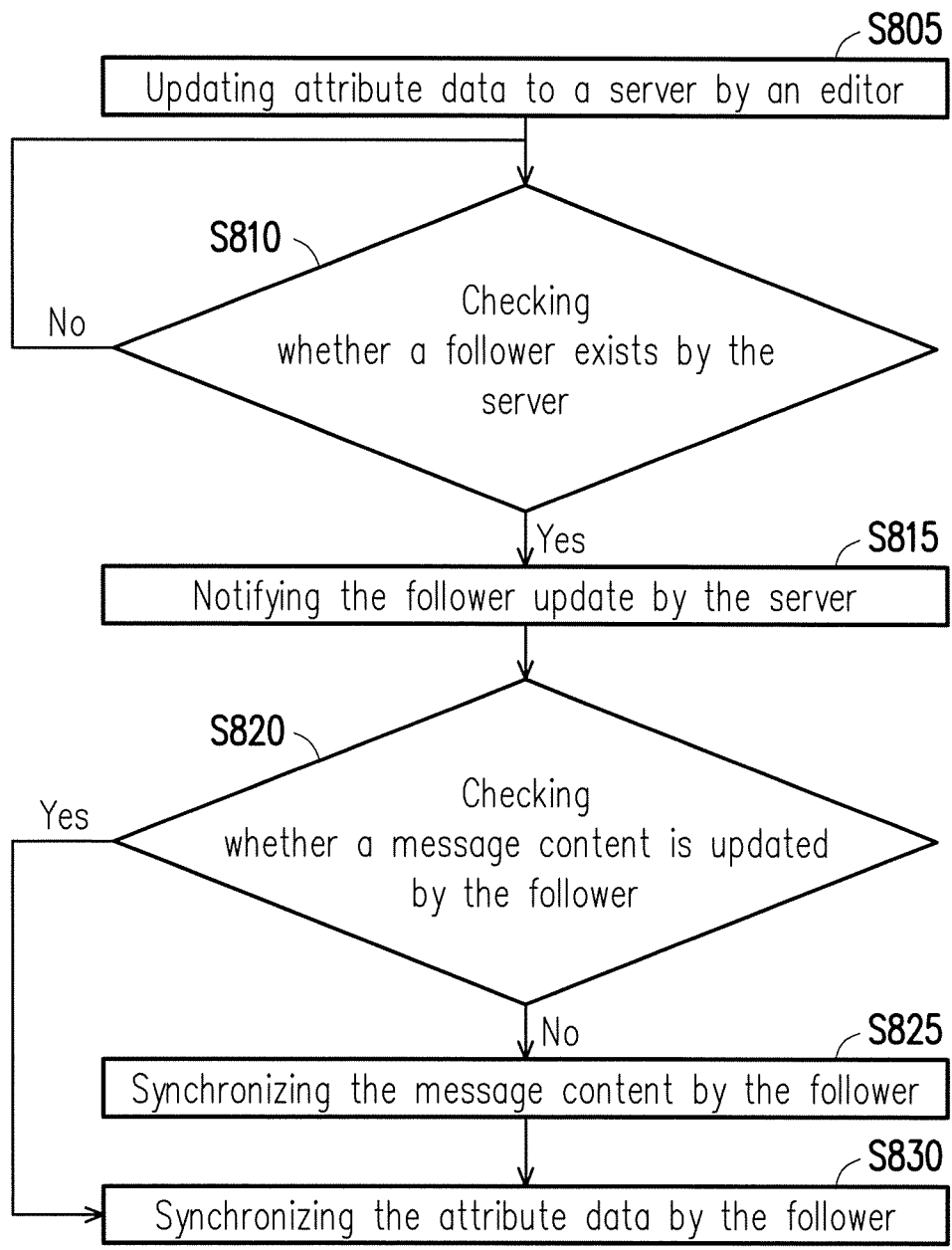
FIG. 8 is a flowchart of a message synchronization method between an editor and a follower according to an embodiment of the invention.

FIG. 8 is a flowchart of a message synchronization method between an editor and a follower according to an embodiment of the invention. Referring to FIG. 8, in step S805, attribute data is updated to the server 110 by an editor. Next, in step S810, whether said editor has a follower is checked by the server 110. After the editor is detected to have a follower, in step S815, a follower is notified to update by the server 110. In step S820, whether a message content in a message area of a storage device of a follower is synchronized with a message content in a message area of the server 110 is checked by the follower. If the message contents are not synchronized, in step S825, the message contents are synchronized by the follower. If the message content of the follower is synchronized with the message content of the server 110, in step S830, the attribute data is synchronized by the follower.

The electronic apparatus 120-1 is exemplified as the editor, and the electronic apparatus 120-2 is exemplified as one of the followers in the following to describe the processing process performed by the message processing module 114 of the server 110. Here, one follower is illustrated as example; however, in other embodiments, the number of the follower may be two or more than two.

When the instant messaging interface of one of the electronic apparatus 120-1 triggers an edit mode, a first notification is sent to the server 110 by the electronic apparatus 120-1 (followed connection account). When the first notification is received by the server 110 through the networking device 113 from the electronic apparatus 120-1, a role tag of the electronic apparatus 120-1 sending the first notification is marked as an editor tag and the rest of the electronic apparatuses 120-2 to 120-N are notified by the server 110. When said first notification is received and the attribute data is received from the electronic apparatus 120-1 by the server 110, the attribute data is transmitted to the electronic apparatus 120-2 setting the electronic apparatus 120-1 sending the first notification as a followed connection account.

In addition, when the instant messaging interface of electronic apparatus 120-2 triggers a viewing mode, a second notification (a followed connection account is included in the second notification) is sent to the server 110 by the electronic apparatus 120-2 (follower account). When the second notification is received by the server 110 through the networking device 113 from the electronic apparatus 120-2, a role tag of the electronic apparatus 120-2 sending the second notification is marked as a follower tag and the rest of the electronic apparatuses 120-1, 120-3 to 120-N are notified by the server 110. Moreover, as the followed connection account (the electronic apparatus 120-1 herein) is included in the second notification, the role tag of the electronic apparatus 120-2 is thus marked as the follower tag following the electronic apparatus 120-1 by the server 110. When said second notification is received by the server 110, the attribute data received from the electronic apparatus 120-1 corresponding to the followed connection account is transmitted to the electronic apparatus 120-2 by the server 110. When the server 110 receives each one of updates of the attribute data from the electronic apparatus 120-1, the server 110 notifies the electronic apparatus 120-2 and transmits the attribute data of the electronic apparatus 120-1 to the electronic apparatus 120-2. After the message contents are synchronized, the attribute data is also synchronized, and a screen in a preview area of the electronic apparatus 120-2 is further updated by the electronic apparatus 120-2.

In addition, in other embodiments, the electronic apparatus may also be connected to an external display. The electronic apparatus further includes an external connection port, and the external connection port is connected to the external display through technologies such as mini high definition multimedia interface (mini-HDMI) and universal serial bus (USB) Type-C or through wireless display technologies such as Miracast.

FIG. 9 is a schematic diagram of an electronic apparatus according to another embodiment of the invention. Referring to FIG. 9, the electronic apparatus 120-3 is connected to an external display 920 through an external connection port (not shown). An instant messaging interface 910 is displayed in a built-in display of the electronic apparatus 120-3. Buttons disposed on the instant messaging interface 910 are substantially similar to that disposed on the instant messaging interface 600 in FIG. 6, and thereby, FIG. 6 may be referenced for related description. In the present embodiment, when the external connection port is detected by a processor of the electronic apparatus 120-3 to be connected to the external display 920, a preview area 921 is displayed in the external display 920, and a preview area of the instant messaging interface 910 displayed on the built-in display is hidden. Furthermore, after the preview area of the instant messaging interface 910 displayed on the built-in display is hidden, a communication area 310'' of the instant messaging interface 910 is enlarged.

After a position and a size of the preview area originally displayed on the built-in display are re-calculated through the processor, image data of the preview area is projected onto the external display 920 by the electronic apparatus 120-3. In other words, only the image data is received by the external display 920, and message contents and attribute data are still stored in the electronic apparatus 120-3.

As shown in FIG. 9, the communication area 310'' includes a plurality of message contents 911 to 915 and respectively corresponding selection boxes 911a to 915a. Here, after the selection box 913a is clicked to select the message content 913 as an edited target, a message content object 923 corresponding to the message content 913 synchronously appears in the preview area 921 of the external display 920. Besides, the communication area 310'' may also be displayed in the external display 920, which is not to be limited by the present invention herein. The external display 920 may also be equipped with touch function. Accordingly, when the communication area 310'' is displayed in the external display 920, a touch operation may be performed on the external display 920 by a user.

In the foregoing embodiments, each of the electronic apparatuses is connected to the server 110 through the networking device. Each of the electronic apparatuses is configured to choose to enter the edit mode after entering a group chat room and has respective preview area (e.g., a canvas for editing) in the storage device (e.g., the memory). The canvas can be displayed through the built-in display or the external display, and the message contents of conversation may be edited as documents or pictures and stored into the storage device.

The user of each of the electronic apparatuses may edit in respective preview area of each of the electronic apparatuses by the user himself/herself through a touch operation, or the user may follow preview areas of other electronic apparatuses through networking device. For instance, it is assumed that editing is performed by an electronic apparatus A, and the electronic apparatus A is viewed by the electronic apparatuses B and C, after editing is completed by the electronic apparatus A, the electronic apparatus B may enter an edit mode to perform modification continuously. The electronic apparatus B is at this time in the edit mode, and the electronic apparatuses A and C are switched to a viewing mode and are configured to choose to follow the electronic apparatus B.

For another example, it is assumed that editing is performed by the electronic apparatus A, and the electronic apparatus A is viewed by the electronic apparatuses B and C. Even if the electronic apparatus A is disconnected, the electronic apparatuses B and C may continue to perform discussion in a communication area through the network, and one editor may be selected to perform editing continuously. If the electronic apparatus B is selected as the editor, the electronic apparatus B enters the edit mode, and a following target of the electronic apparatus C is changed from the electronic apparatus A to the electronic apparatus B. At the same time, editing may continue to be performed by the electronic apparatus A off-line. After connection is resumed, which electronic apparatus is to be followed is determined by the electronic apparatuses A, B, and C, and corresponding attribute data is then downloaded from a server.

To sum up, in the embodiments of the invention, editing may be performed synchronously when communication is performed by the users through providing the edit mode in the instant messaging interface. The preview area is provided to present contents being edited. Accordingly, operating and editing on the instant messaging interface thus become easier. Furthermore, the preview area and the communication area are provided in the edit mode of the electronic apparatus. Touch editing function is provided in the communication area, editing may be performed on the edited target by the user in the communication area, and the edited content is displayed in the preview area. It is thus can be seen that when numerous message content objects appear, problems such as the objects become difficult to be selected owing to object overlapping are solved. Besides, the viewing mode is further provided, contents edited by other electronic apparatuses may thus be selectively viewed. Accordingly, by utilizing the characteristic of communications conducted among users, opinions on the edited contents from other users may be obtained instantly. Moreover, the users may also assist in editing. As such, an editing scheme is completed in line with expectations from all sides, and effect of instant message editing among numerous users is achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. An instant messaging method, comprising:
activating an instant messaging interface in an electronic apparatus, and displaying a communication area in the instant messaging interface, wherein the communication area is configured to display a plurality of dialog boxes, each of the plurality of dialog boxes corresponds to at least one message content between a connection account used by the electronic apparatus and other connection accounts used by other electronic apparatuses;
adding a preview area to the instant messaging interface after the instant messaging interface triggers an edit mode, and activating a touch edit function of the communication area to allow a user to perform editing in the communication area;

displaying the message content corresponding to a selected edited target in the preview area of the instant messaging interface after determining the at least one dialog box in the communication area is selected as the edited target, wherein the preview area is different from the communication area;

receiving a touch operation corresponding to the edited target in the communication area, and generating attribute data based on the touch operation;

adjusting the message content corresponding to the selected edited target in the preview area based on the attribute data;

receiving another attribute data transmitted by a followed connection account in the edit mode from another electronic apparatus in response to the instant messaging interface triggers a viewing mode;

displaying a corresponding content based on the another attribute data corresponding to the followed connection account in the preview area of the instant messaging interface;

notifying a server through the electronic apparatus in response to the instant messaging interface triggers the viewing mode, such that the server marks a role tag of the electronic apparatus as a follower tag and notifies other electronic apparatuses communicating with the electronic apparatus; and notifying the server through the electronic apparatus in response to the instant messaging interface triggers the edit mode, such that the server marks the role tag of the electronic apparatus as an editor tag and notifies the other electronic apparatuses communicating with the electronic apparatus.

2. The instant messaging method as claimed in claim 1, wherein a step of receiving the touch operation corresponding to the edited target in the communication area comprises:
setting an initial touch position of the touch operation as an initial point after determining the touch operation is received within a touch range corresponding to the edited target, and setting the initial point as a reference point of a gesture;
enlarging the touch range, continuously receiving the touch operation within the enlarged touch range;
determining whether another touch operation corresponding to the edited target is received within the enlarged touch range in a predetermined time after the touch operation is released; and
setting an initial touch position of the another touch operation as the initial point after determining the another touch operation is received within the enlarged touch range in the predetermined time, resetting the initial point as the reference point of the gesture, and continuously receiving the another touch operation in the enlarged touch range.

3. The instant messaging method as claimed in claim 1, wherein the method further comprises:
when a server determines a follower account in a plurality of connection accounts triggers a viewing mode and sets the electronic apparatus as a followed connection account, transmitting the attribute data corresponding to the edited target through the server to another electronic apparatus corresponding to the follower account.

4. The instant messaging method as claimed in claim 1, further comprising:
displaying the preview area in an external display when detecting the electronic apparatus being connected to the external display.

5. An instant messaging system, comprising:
a plurality of electronic apparatuses, wherein each of the electronic apparatuses comprises:
a first networking device;
a first storage device, comprising an instant messaging module; and
a first processor, coupled to the first networking device and the first storage device, driving the instant messaging module to perform an instant messaging process, the instant messaging process comprising:
activating an instant messaging interface, and displaying a communication area in the instant messaging interface, wherein the communication area is configured to display a plurality of dialog boxes, each of the plurality of dialog boxes corresponds to at least one message content between a connection account used by the electronic apparatus and other connection accounts used by other electronic apparatuses;
adding a preview area to the instant messaging interface after the instant messaging interface triggers an edit mode, and activating a touch edit function of the communication area to allow a user to perform editing in the communication area;
displaying the message content corresponding to a selected edited target in the preview area of the instant messaging interface after determining the at least one dialog box in the communication area is selected as the edited target, wherein the preview area is different from the communication area;
receiving a touch operation corresponding to the edited target in the communication area, and generating attribute data based on the touch operation;
adjusting the message content corresponding to the selected edited target in the preview area based on the attribute data;
receiving another attribute data from another electronic apparatus corresponding to a followed connection account in the edit mode in response to the instant messaging interface triggers a viewing mode;
displaying a corresponding content based on the another attribute data corresponding to the followed connection account in the preview area of the instant messaging interface;
notifying a server through the first networking device in response to the instant messaging interface triggers the viewing mode, such that the server marks a role tag of the corresponding electronic apparatus as a follower tag and notifies the rest of the electronic apparatuses; and
notifying the server through the first networking device in response to the instant messaging interface triggers the edit mode, such that the server marks the role tag of the corresponding electronic apparatus as an editor tag and notifies the rest of the electronic apparatuses.

6. The instant messaging system as claimed in claim 5, wherein in the instant messaging process of each of the electronic apparatuses, receiving the touch operation corresponding to the edited target in the communication area comprises:
setting an initial touch position of the touch operation as an initial point after determining the touch operation is received within a touch range corresponding to the edited target, and setting the initial point as a reference point of a gesture;
enlarging the touch range, and continuously receiving the touch operation within the enlarged touch range;

determining whether another touch operation corresponding to the edited target is received within the enlarged touch range in a predetermined time after the touch operation is released; and setting an initial touch position of the another touch operation as the initial point after determining the another touch operation is received within the enlarged touch range in the predetermined time, resetting the initial point as the reference point of the gesture, and continuously receiving another touch operation within the enlarged touch range.

7. The instant messaging system as claimed in claim 5, further comprises:

a server, comprising:

a second storage device, comprising a message processing module;

a second networking device, connected to the first networking device through a network, receiving the attribute data from each of the electronic apparatuses to store the attribute data into the second storage device; and a second processor, coupled to the second networking device and the second storage device, driving the message processing module to perform a processing process, the processing process comprising:

when the server determines a follower account in a plurality of connection accounts triggers a viewing mode and one of the electronic apparatus is set as a followed connection account, the attribute data of the followed connection account is transmitted through the sever to one of the electronic apparatuses corresponding to the follower account.

8. The instant messaging system as claimed in claim 5, wherein each of the electronic apparatuses further comprises an external connection port, and the instant messaging process of each of the electronic apparatuses further comprises:

when the external connection port is detected to be connected to an external display, displaying the preview area in the external display.

9. An electronic apparatus, comprising, a networking device;

a storage device, comprising an instant messaging module; and a processor, coupled to the networking device and the storage device, driving the instant messaging module to perform an instant messaging process, the instant messaging process comprising:

activating an instant messaging interface, and displaying a communication area in the instant messaging interface, wherein the communication area is configured to display a plurality of dialog boxes, each of the plurality of dialog boxes corresponds to at least one message content between a connection account used by the electronic apparatus and other connection accounts used by other electronic apparatuses;

adding a preview area to the instant messaging interface after the instant messaging interface triggers an edit mode, and activating a touch edit function of the communication area to allow a user to perform editing in the communication area;

displaying the message content corresponding to a selected edited target in the preview area of the instant messaging interface after determining the at least one dialog box in the communication area is selected as the edited target, wherein the preview area is different from the communication area;

receiving a touch operation corresponding to the edited target in the communication area, and generating attribute data based on the touch operation;

adjusting the message content corresponding to the selected edited target in the preview area based on the attribute data;

receiving another attribute data from another electronic apparatus corresponding to a followed connection account in the edit mode in response to the instant messaging interface triggers a viewing mode;

displaying a corresponding content based on the another attribute data corresponding to the followed connection account in the preview area of the instant messaging interface;

notifying a server through the networking device in response to the instant messaging interface triggers the viewing mode, such that the server marks a role tag of the electronic apparatus as a follower tag and notifies other electronic apparatuses communicating with the electronic apparatus; and notifying the server through the networking device in response to the instant messaging interface triggers the edit mode, such that the server marks the role tag of the electronic apparatus as an editor tag and notifies the other electronic apparatuses communicating with the electronic apparatus.

10. The electronic apparatus as claimed in claim 9, wherein in the instant messaging process, receiving the touch operation corresponding to the edited target in the communication area comprises:

setting an initial touch position of the touch operation as an initial point after determining the touch operation is received within a touch range corresponding to the edited target, and setting the initial point as a reference point of a gesture;

enlarging the touch range, and continuously receiving the touch operation within the enlarged touch range;

determining whether another touch operation corresponding to the edited target is received within the enlarged touch range in a predetermined time after the touch operation is released; and setting an initial touch position of the another touch operation as the initial point after determining the another touch operation is received within the enlarged touch range in the predetermined time, resetting the initial point as the reference point of the gesture, and continuously receiving another touch operation within the enlarged touch range.

11. The electronic apparatus as claimed in claim 9, further comprising an external connection port, the instant messaging process further comprising:

when the external connection port is detected to be connected to an external display, displaying the preview area in the external display.

12. The electronic apparatus as claimed in claim 9, wherein the instant messaging process further comprising:

transmitting the attribute data corresponding to the edited target to a server through the networking device.

\* \* \* \* \*